(12) United States Patent
Jang et al.

(10) Patent No.: US 12,703,052 B2
(45) Date of Patent: Aug. 11, 2026

(54) DEVICE FOR ASSEMBLING BOOT AND SEALING RING OF CONSTANT VELOCITY JOINT OF VEHICLE

(71) Applicant: HANSAE MOBILITY CO., LTD., Daegu (KR)

(72) Inventors: Dal Soo Jang, Daegu (KR); Jong Uk Seo, Daegu (KR)

(73) Assignee: HANSAE MOBILITY CO., LTD., Daegu (KR)

( * ) Notice: Subject to any disclaimer, the term of this patent is extended or adjusted under 35 U.S.C. 154(b) by 340 days.

(21) Appl. No.: 18/285,089

(22) PCT Filed: Apr. 1, 2022

(86) PCT No.: PCT/KR2022/004689
§ 371 (c)(1),
(2) Date: Sep. 29, 2023

(87) PCT Pub. No.: WO2022/211568
PCT Pub. Date: Oct. 6, 2022

(65) Prior Publication Data

US 2024/0181580 A1 Jun. 6, 2024

(30) Foreign Application Priority Data

Apr. 2, 2021 (KR) ........................ 10-2021-0043467

(51) Int. Cl.
*B23P 19/00* (2006.01)
*B23P 19/08* (2006.01)
(Continued)

(52) U.S. Cl.
CPC ............ *B23P 19/086* (2013.01); *F16D 3/845* (2013.01); *F16D 2003/22316* (2013.01); *F16D 2003/22326* (2013.01)

(58) Field of Classification Search
CPC ......... B23P 19/00; B23P 19/10; B23P 19/086; B23P 19/12
See application file for complete search history.

(56) References Cited

U.S. PATENT DOCUMENTS 4,476,861 A * 10/1984 Dimakos ................ A61B 17/92 606/100
4,564,988 A 1/1986 Norrod
(Continued)

FOREIGN PATENT DOCUMENTS

CA 2414417 A1 6/2003
FR 2903333 A1 1/2008
(Continued)

OTHER PUBLICATIONS

International Search Report of PCT/KR2022/004689 dated Jun. 27, 2022 [PCT/ISA/210].
(Continued)

*Primary Examiner* — Lee D Wilson
(74) *Attorney, Agent, or Firm* — Sughrue Mion, PLLC

(57) ABSTRACT

An assembling device is a device for assembling a boot and a sealing ring to an inner race of a constant velocity joint in which a fixing part of the boot is fastened to the inner race by the sealing ring and includes: a guider provided with a guide surface on an outer surface to guide the boot and the sealing ring along a longitudinal direction of the inner race; and a pusher that provides a force to move the boot and the sealing ring along the guide surface to reach a support surface of the inner race.

6 Claims, 7 Drawing Sheets

(51) Int. Cl.
*F16D 3/84* (2006.01)
*F16D 3/223* (2011.01)

(56) References Cited

U.S. PATENT DOCUMENTS

| | | | | |
|---|---|---|---|---|
| 5,353,489 | A | 10/1994 | Weaver | |
| 5,355,574 | A * | 10/1994 | Zweekly | B25B 27/062 29/262 |
| 6,049,960 | A | 4/2000 | Pilling et al. | |
| 6,571,819 | B1 | 6/2003 | Capoferi | |
| 7,131,197 | B1 * | 11/2006 | Biro | B25B 27/0028 29/888.3 |
| 7,918,003 | B2 * | 4/2011 | Acciardo, Jr. | B25B 27/062 29/270 |
| 8,313,107 | B2 | 11/2012 | Hoets et al. | |
| 9,494,199 | B2 | 11/2016 | Schumacher et al. | |
| 11,117,246 | B2 * | 9/2021 | Whitehead | B25B 27/04 |
| 11,370,093 | B2 * | 6/2022 | Kochie | B25B 5/163 |
| 11,754,142 | B2 * | 9/2023 | Hoffman | F16F 15/08 29/428 |
| 12,358,108 | B1 * | 7/2025 | Andrews | B25B 27/023 |
| 2006/0070221 | A1 * | 4/2006 | Wridt | B25B 27/062 29/257 |
| 2006/0137160 | A1 * | 6/2006 | Chung | B25B 27/28 29/259 |
| 2020/0171634 | A1 * | 6/2020 | Whitehead | B25B 27/0035 |
| 2024/0181580 | A1 * | 6/2024 | Jang | B23P 19/086 |

FOREIGN PATENT DOCUMENTS

| | | | |
|---|---|---|---|
| JP | 06-312326 | A | 11/1994 |
| JP | 08-332575 | A | 12/1996 |
| JP | 2002-070814 | A | 3/2002 |
| JP | 2008-106499 | A | 5/2008 |
| KR | 20-0244350 | Y1 | 10/2001 |
| KR | 10-2009-0097352 | A | 9/2009 |
| KR | 10-2019-0131702 | A | 11/2019 |

OTHER PUBLICATIONS

Communication dated Feb. 12, 2025 issued by the European Patent Office in application No. 22781687.3.

* cited by examiner

【FIG. 1】
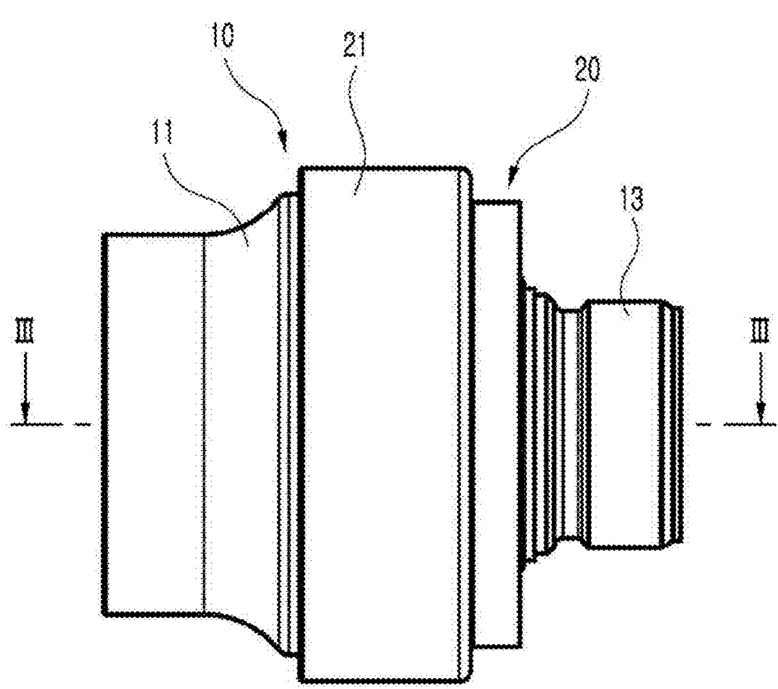

【FIG. 2】
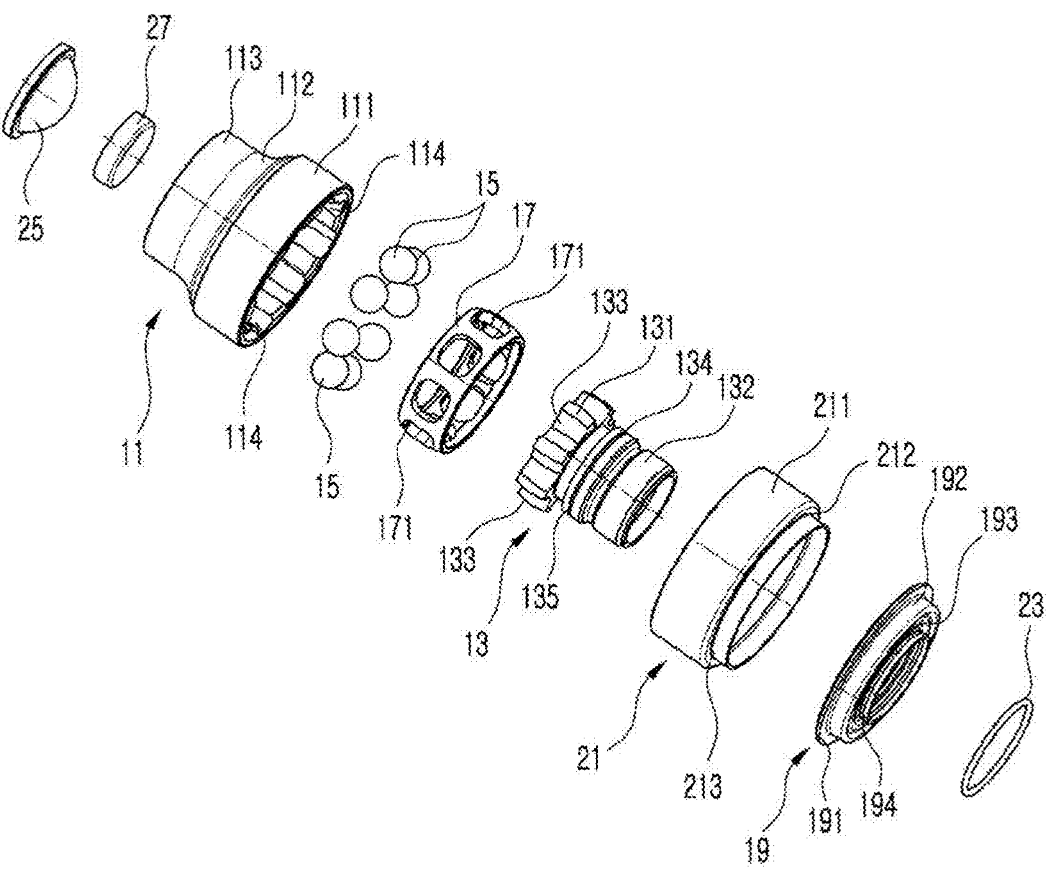

【FIG. 3】
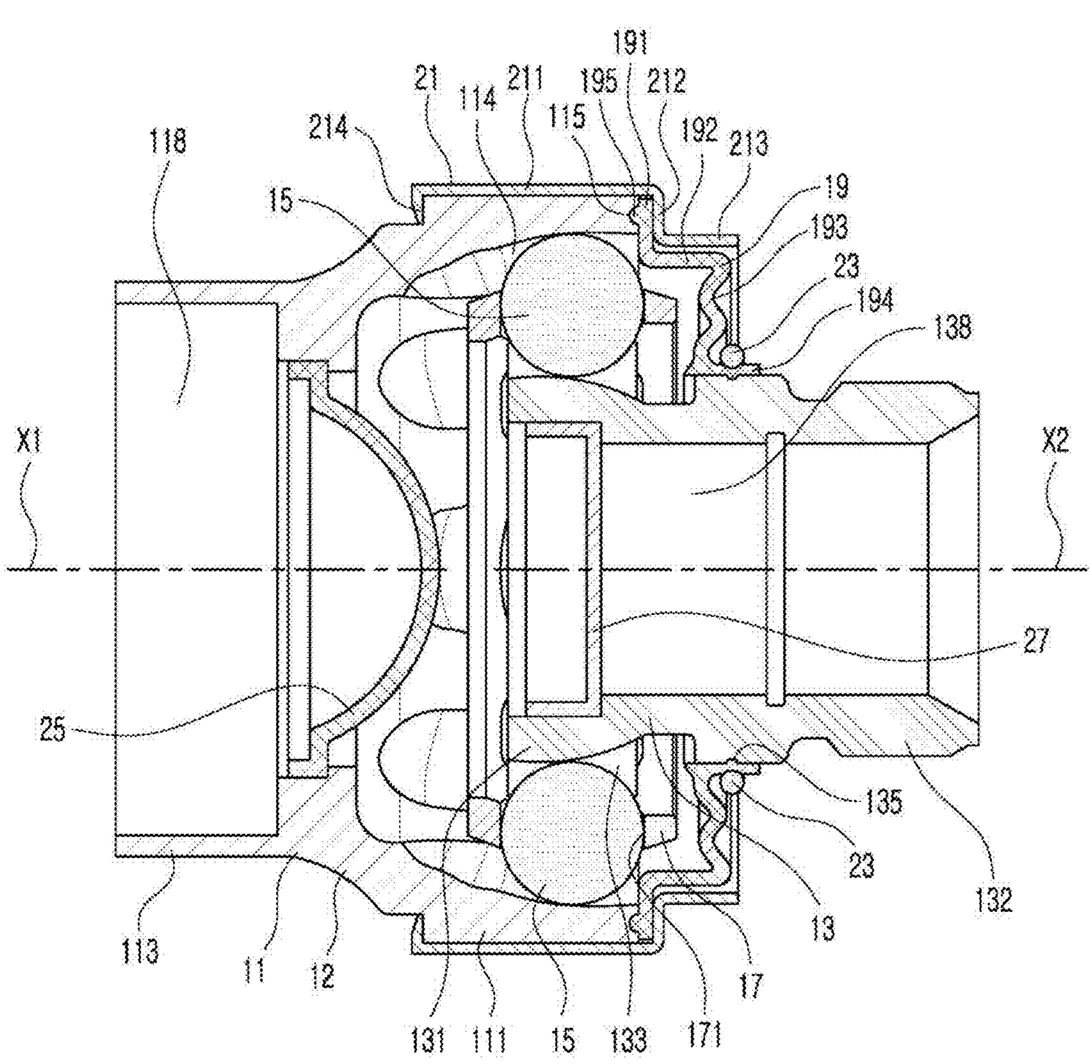

【FIG. 4】
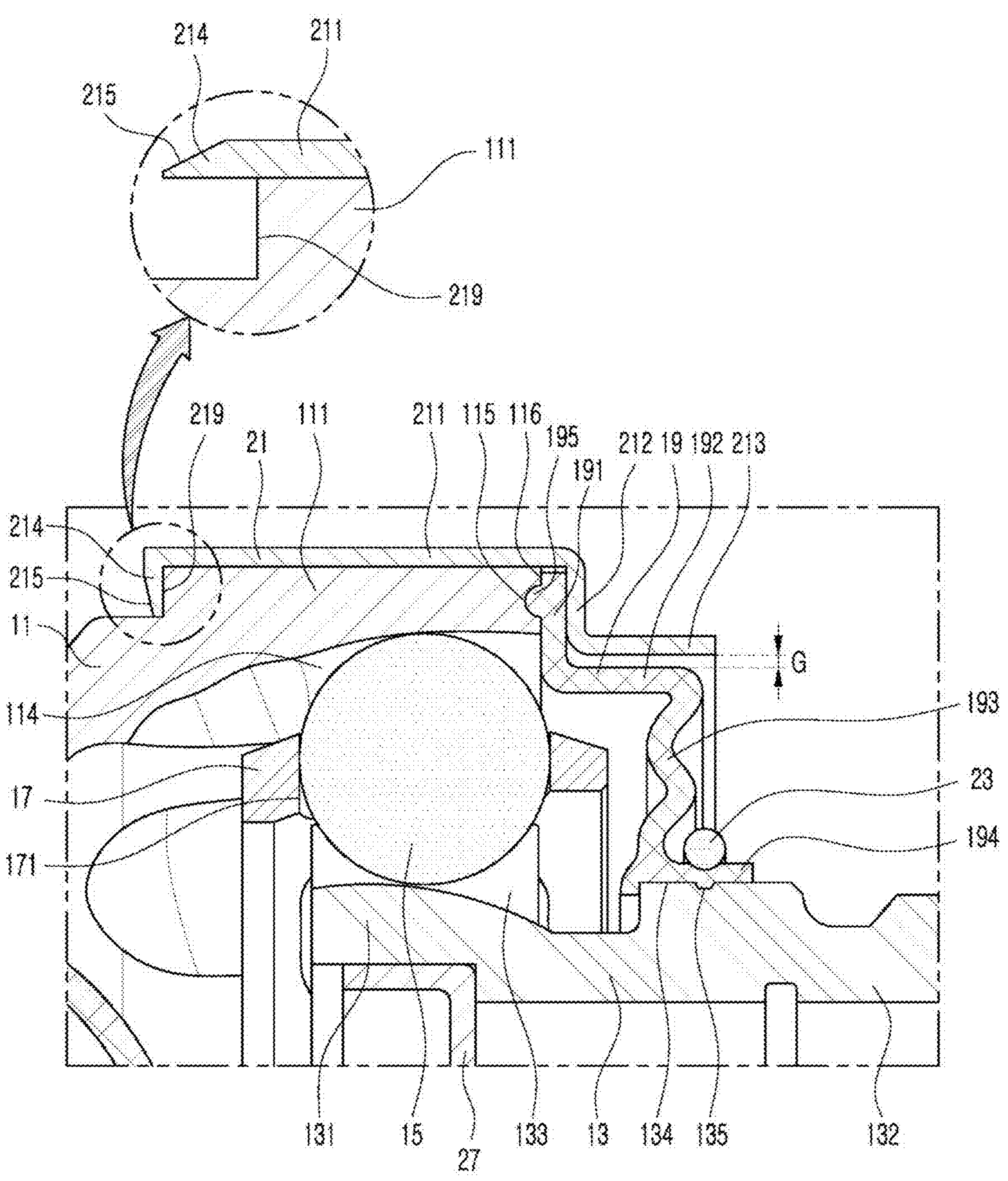

【FIG. 5】
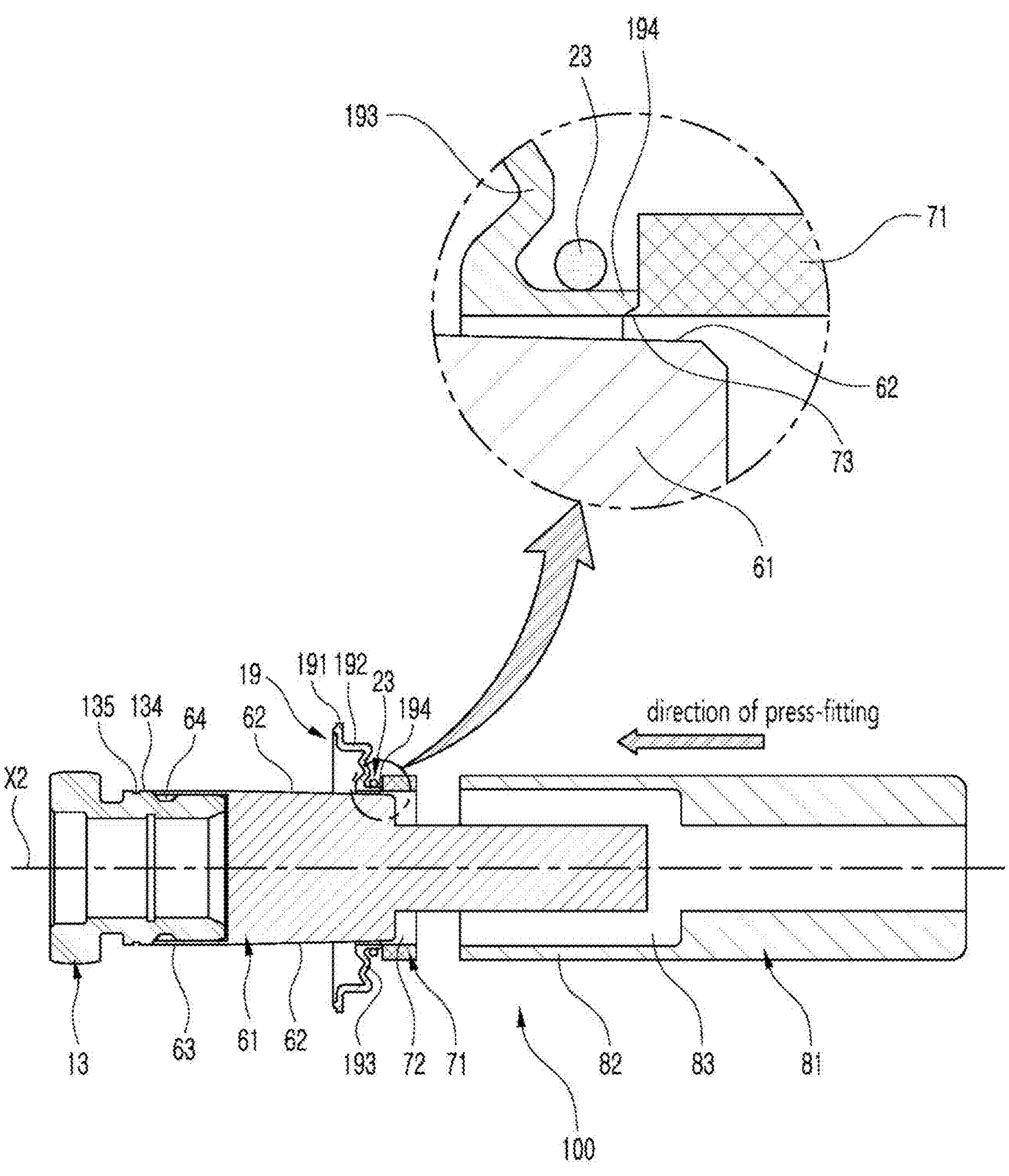

【FIG. 6】
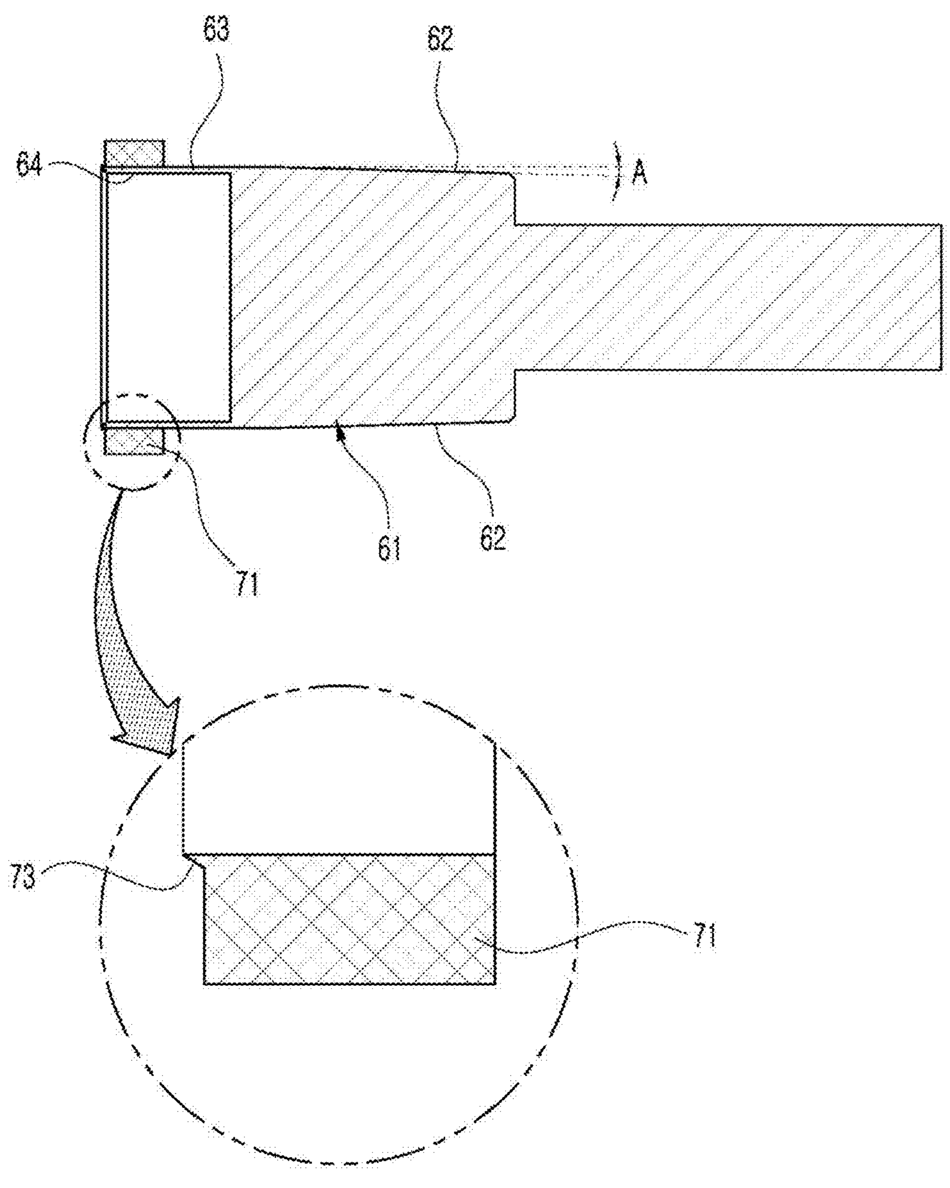

【FIG. 7】
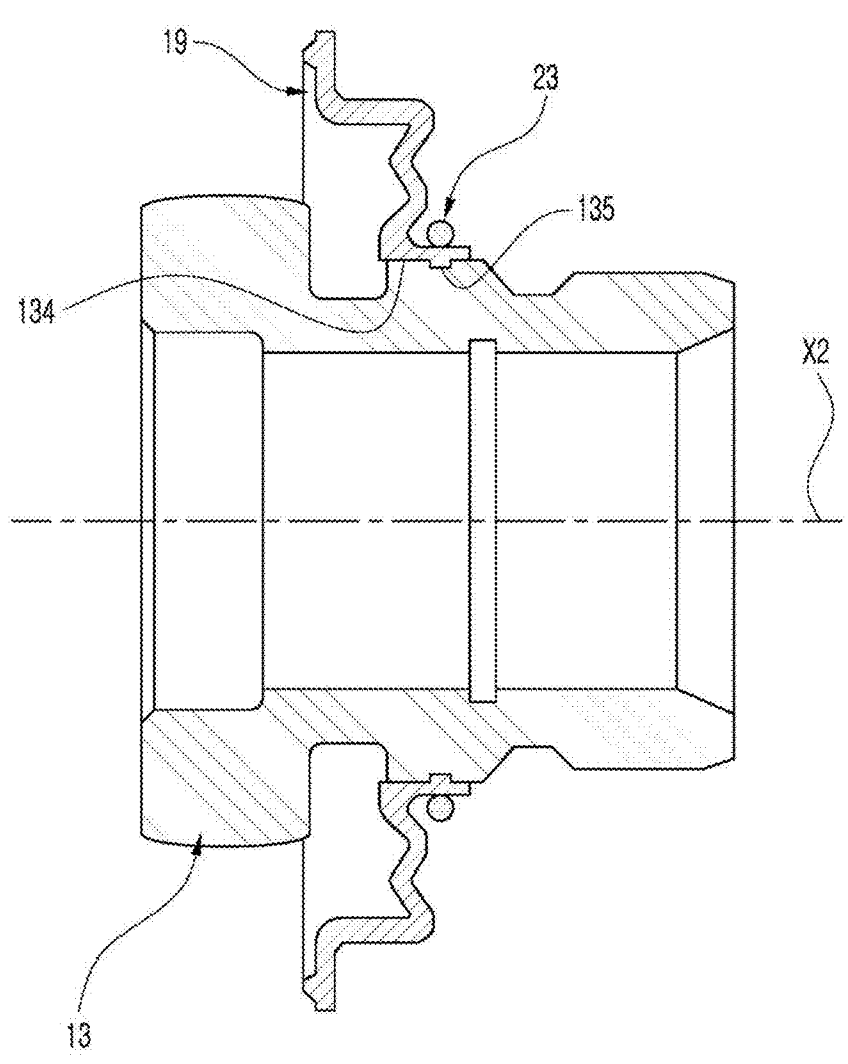

DEVICE FOR ASSEMBLING BOOT AND SEALING RING OF CONSTANT VELOCITY JOINT OF VEHICLE

TECHNICAL FIELD

The present invention relates to a constant velocity joint used to transmit power in a vehicle, and more specifically, to a device for assembling a boot and a sealing ring of a constant velocity joint onto an inner race.

BACKGROUND ART

A constant velocity joint is a device that transmits rotational driving force and is used as a device to transmit rotational driving force by being incorporated to a drive shaft, a propeller shaft, and the like for vehicles.

A constant velocity joint like a Rzeppa joint includes an outer race, an inner race, a plurality of balls disposed between the outer and inner races, and a ball cage that accommodates the balls. In such a constant velocity joint, the outer race typically has an open side, and the balls, the ball cage, and the inner race are inserted through this open side. A space between the outer race and the inner race where the balls and the ball cage are disposed is filled with grease for lubrication. To seal the grease, a boot is typically attached to both the outer and inner races. Generally, the boot is secured to both the outer and inner races using a crimping method with clamps.

In general, a constant velocity joint and a boot require a compact design. Specifically, a constant velocity joint applied to a propeller shaft needs a compact boot design due to the high-speed rotation, which has led to the introduction of a method that uses a sealing ring instead of the conventional band-type clamp for securing the boot to the relatively smaller-diameter inner race among the two boot attachments. However, there is a problem during the assembling process where the sealing ring can potentially damage the boot, which is typically made of a rubber-like material.

PRIOR DOCUMENTS

U.S. Pat. No. 8,313,107 (2012 Nov. 20)
U.S. Pat. No. 9,494,199 (2016 Nov. 15)

DETAILED DESCRIPTION OF THE INVENTION

Technical Object

An object of the present invention is to provide an assembling device that allows to assemble a boot and a sealing ring in a simple and efficient manner without damaging the boot.

Technical Solutions

An assembling device according to an embodiment of the present invention is a device for assembling a boot and a sealing ring to an inner race of a constant velocity joint in which a fixing part of the boot is fastened to the inner race by the sealing ring and includes: a guider provided with a guide surface on an outer surface to guide the boot and the sealing ring along a longitudinal direction of the inner race; and a pusher that provides a force to move the boot and the sealing ring along the guide surface to reach a support surface of the inner race.

The guide surface may be an inclined guide surface formed to be inclined with respect to a movement direction of the boot and the sealing ring.

The inclined guide surface may be formed to be inclined at an angle of 10 to 5°.

The assembling device according to another embodiment of the present invention may further include a supporter interposed between the boot and the sealing ring assembled to each other and configured to move along a circumference of the guide in a movement direction of the boot and the sealing ring as the pusher moves, allowing the boot and sealing ring to be pushed.

The fixing part may have a ring shape, and the supporter has a protrusion that is inserted between an inner surface of the fixing part and the guide surface.

The protrusion may have a wedge shape that becomes sharper towards a leading edge.

The pusher may be configured to move under a load of 300 to 1500 N while pushing the boot and the sealing ring.

Effects of the Invention

According to the present invention, it is possible to assemble a boot and a sealing ring in a simple and efficient manner during the assembling process without damaging the boot.

BRIEF DESCRIPTION OF DRAWINGS

FIG. 1 is a front view of a constant velocity joint to which a device for assembling a boot and a sealing ring according to an embodiment of the present invention can be applied.

FIG. 2 is an exploded perspective view of a constant velocity joint of FIG. 1.

FIG. 3 is a sectional view taken along a line III-III of FIG. 1.

FIG. 4 is an enlarged partial view of FIG. 3.

FIG. 5 is a schematic diagram illustrating a device for assembling a boot and a sealing ring according to an embodiment of the present invention and the process by which a boot and a sealing ring are assembled onto an inner race.

FIG. 6 is a diagram showing a guider and a supporter of a device for assembling a boot and a sealing ring according to an embodiment of the present invention.

FIG. 7 is a sectional view showing the state in which a boot and a sealing ring have been assembled onto an inner race by a device for assembling a boot and a sealing ring according to an embodiment of the present invention.

EMBODIMENTS FOR CARRYING OUT THE INVENTION

In the following, detailed descriptions of embodiments of the present invention will be given with reference to the attached drawings.

FIG. 1 to FIG. 4 illustrate a constant velocity joint that includes an inner race with a boot and a sealing ring assembled by a device according to an embodiment of the present invention, while FIG. 5 to FIG. 7 show a device for assembling a boot and a sealing ring according to an embodiment of the present invention and a boot and a sealing ring assembled on an inner race. First, referring to FIG. 1 to FIG. 4, an exemplary constant velocity joint where a boot and a sealing ring assembled by a device according to an embodiment of the present invention are applied will be described, and referring to FIG. 5 to FIG. 7, a device for assembling a boot and a sealing ring according to an embodiment of the present invention and the associated assembly process will be described.

Referring to FIG. 1 to FIG. 3, a constant velocity joint 10 includes an outer race 11 and an inner race 13 configured to be respectively connected to separate power transmission elements. A ball 15 acts as a medium for transmitting torque and is placed between the outer race 11 and the inner race 13 in a state of being accommodated in a pocket 171 of a ball cage 17. The ball 15 may be provided in a plurality, and the outer race 11 and the inner race 13 may each have outer ball grooves 114 and inner ball grooves 133 that pair up to form spaces that accommodate each ball 15. Rotational power transmission between the outer race 11 and the inner race 13 takes place through the ball 15 placed in the space formed by the outer ball grooves 114 and the inner ball grooves 133. FIG. 2 exemplarily shows a case where eight balls 15 are provided, but the number of balls 15 is not limited to this and can vary, such as six, ten, etc.

The outer race 11 may include a power transmission part 111 with outer ball grooves 114 formed on an inner surface thereof, a connecting part 113 configured to be connected to a power transmission shaft (not shown), and a connection part 112 connecting the power transmission part 111 and the connecting part 113. The outer race 11 may form a through-hole 118 that extends along the axial direction X1 to penetrate the power transmission part 111, the connection part 112, and the connecting part 113. The inner race 13 may include a power transmission part 131 with inner ball grooves 133 formed on an outer surface thereof and a shaft part 132 extending in an axial direction X2 from the power transmission part 131. The inner race 13 may form a through-hole 138 extending along an axial direction X2 to penetrate the power transmission part 131 and the shaft part 132. For example, when a constant velocity joint according to an embodiment of the present invention is installed between a differential gear and a propeller shaft, the inner race 13 can be coupled to an output shaft of the differential gear inserted into the through-hole 138 via spline coupling, and the connecting part 113 of the outer race 11 can be coupled to a hollow shaft of the propeller shaft via welding.

The outer race 11 and the inner race 13 may be configured to rotate for power transmission while being angularly displaced from each other. In FIG. 3, the longitudinal axes X1 and X2 of the outer race 11 and inner race 13 are shown in a non-angularly displaced state where they are coaxial. In an angularly displaced state, the relative positions of the outer race 11 and the inner race 13 change, so the two longitudinal axes X1 and X2 are not aligned parallel to each other. The constant velocity joint according to an embodiment of the present invention is designed to allow the outer race 11 and the inner race 13 to rotate while being angularly displaced within a predetermined angular range.

Although not shown in the drawings, grease is filled in a space where the ball 15 and the ball cage 17 are located for lubrication. Referring to FIG. 2 and FIG. 3, to prevent the leakage of grease through the through-hole 118 of the outer race 11 and the through-hole 138 of the inner race 13, grease retainers 25 and 27 that can block these through-holes 118 and 138 can be coupled to the outer race 11 and the inner race 13 respectively.

The grease sealing structure 20 provides grease sealing between the outer race 11 and the inner race 13. The grease sealing structure 20 may include a boot 19, a clamping cap 21, and a sealing ring 23. The boot 19 is closely fitted to both the outer race 11 and the inner race 13 to prevent grease, which fills the space where the ball 15 and ball cage 17 are located, from leaking through a space between the outer race 11 and the inner race 13. The boot 19 can be tightly fitted to the outer race 11 by being pressed by the clamping cap 21 and to the inner race 13 by being pressed by the sealing ring 23.

The boot 19 may include a first fixing part 191 for fastening to the outer race 11, a second fixing part 194 for fastening to the inner race 13, and connecting parts 192 and 193 linking the first fixing part 191 and the second fixing part 194. The boot 19 may be made of a material capable of elastic deformation, such as rubber. The connecting parts 192 and 193 may be configured to allow shape deformation during operation in an angularly displaced state. The first fixing part 191 may be configured to be closely fitted to an axial support surface 116 provided at an axial end X1 of the outer race 11, and the second fixing part 194 may be configured to be closely fitted to a radial support surface 134 provided on a radial outer surface of the inner race 13.

In one embodiment of the present invention, as shown in FIG. 3 and FIG. 4, the first fixing part 191 may extend approximately perpendicular to an axial direction X1 of the outer race 11, and the second fixing part 194 may extend approximately parallel to an axial direction X2 of the inner race 13. In an embodiment of the present invention, as shown in FIG. 3 and FIG. 4, the connecting part may include two sections, namely an axial extension part 192 that extends approximately parallel to the axial direction X2 of the inner race 13 from an inner end of the first fixing part 191, and a corrugated section 193 that has a corrugated shape to connect one end of the axial extension part 192 to the second fixing part 194. The corrugated section 193 may have a corrugated shape to extend in a zigzag shape with respect to a radial direction, allowing easy displacement in both the axial direction X2 and the radial direction (vertical direction in FIG. 4).

A clamping cap 21 is configured to be fixed to the outer race 11 and pressurize the first fixing part 191 in the axial direction X1 to be fixedly secured to an axial support surface 116. In more detail, referring to FIG. 4, the clamping cap 21 includes a fastening part, i.e., an axial extension part 211, that is attached to the power transmission part 111 of the outer race 11, and a support part 212 that extends radially inward from one end of the axial extension part 211 to pressurize and clamp the first fixing part 191 in the axial direction X1. The axial extension part 211 has a hollow cylindrical shape and can be press-fitted to the power transmission part 111. In this regard, a movement-limiting part 214 is deformed by caulking to be caught by a catch 219 of the outer race 11 to provide a fastening force in the axial direction X1. For example, the movement-limiting part 214 can be press-fitted to the outer race 11 in a state extending parallel to the axial extension part 211 as shown inside a dotted circle of FIG. 4, and after press-fitted, it can be deformed as shown in FIG. 4 by caulking to be fastened to the catch 219 of the outer race 11. In this regard, to make the deformation of the movement-limiting part 214 easier, a slope 215 may be provided on the outer surface of the movement-limiting part 214.

As shown in FIG. 3 and FIG. 4, with the clamping cap 21 fixed to the outer race 11 while being constrained in the axial direction X2 by the axial extension part 211 and the movement-limiting part 214, the support part 212 pressurizes the first fixing part 191 in the axial direction X1. As a result, the first fixing part 191 of the boot 19 is closely adhered to the axial support surface 116 of the power transmission part 111 in a pressurized state in the axial direction X1. Since the first fixing part 191 of the boot 19 is fixed to the axial support surface 116 of the outer race 11 rather than to the radial outer circumference of the outer race 11, the rotation radius can be reduced.

Meanwhile, to enhance the sealing characteristics between the first fixing part 191 and the axial support surface 116, a groove 115 may be formed on the axial support surface 116, and the first fixing part 191 can be provided with a sealing protrusion 195 that inserts into the groove 115. The groove 115 and the sealing protrusion 195 may have a ring shape extending along the circumferential direction of the power transmission part 111 of the outer race 11. The second fixing part 194 of the boot 19 may be positioned radially inward from the first fixing part 191 and at a certain distance apart axially. By pressing a radial outer surface of the second fixing part 194 with the sealing ring 23, the second fixing part 194 can be pressed against and closely adhere to a radial support surface 134 of the inner race 13. In this regard, to enhance the sealing characteristics between the second fixing part 194 and the radial support surface 134, a groove 135 may be formed in a position corresponding to the location of the sealing ring 23, and a part of the second fixing part 194 can be configured to insert into the groove 135 due to its shape deformation when pressed.

Meanwhile, according to an embodiment of the present invention, an expansion limiting part 213 is provided to restrict expansion in a radial direction (in a vertical direction in FIG. 4) expansion of the axial extension part 192, thereby limiting the radial expansion of the boot 19. As shown in FIG. 4, the expansion limiting part 213 can extend approximately parallel to the axial direction X1 from a radial inner end of the support part 212. The expansion limiting part 213 may have a hollow cylindrical shape that extends in the axial direction X1 while being radially apart outwardly from the outer circumference of the axial extension part 192. By limiting the radial expansion of the boot 19 through the expansion limiting part 213, excessive expansion of the boot 19 can be prevented, and the stress on the boot 19 can be minimized, increasing its durability. Additionally, the expansion limiting part 213 can also serve to protect the radial outer surface of the boot 19 from external contaminants or impacts. The distance between the expansion limiting part 213 of the clamping cap 21 and the axial extension part 192 of the boot 19 may have an appropriate size, and the gap between them can be maintained consistently along the axial direction or can be configured to increase or decrease.

A assembling device 100 for assembling the boot 19 and the sealing ring 23 according to an embodiment of the present invention assembles the assembled boot 19 and sealing ring 23 onto the inner race 13. Referring to FIG. 5, the assembling device 100 pushes the assembled boot 19 and sealing ring 23 in a press-fitting direction parallel to a longitudinal direction X2 of the inner race 13 so that the second fixing part 194 of the boot 19 is positioned on the support surface 134 of the inner race 13. FIG. 7 shows the state where the boot 19 and the sealing ring 23 are assembled onto the inner race 13 by the assembling device according to an embodiment of the present invention, and in this state, the sealing ring 23 is positioned along the longitudinal direction X2 of the inner race 13 corresponding to the groove 135 on the support surface 134. The support surface 134 of the inner race 13 has a cylindrical shape, and the fixing part 194 of the boot 19 can have correspondingly a ring shape that can surround the support surface 134.

Referring to FIG. 5, the assembling device 100 according to an embodiment of the present invention includes a guider 61 and a pusher 81. FIG. 5 shows the guider 61, a supporter 71, and a pusher 81 in a sectional view, and they can be configured to perform the assembling of the sealing ring 23 of the boot 19 while being arranged coaxially with the longitudinal direction X2 of the inner race 13.

Firstly, as shown in FIG. 5, the guider 61 is arranged coaxially with the inner race 13. The guider 61 has a guiding surface 62 on its outer surface that can guide the movement in the assembly direction, i.e., the press-fitting direction, of the boot 19 and the sealing ring 23 assembled to each other. Referring to FIG. 6, the inclined guiding surface 62 may be formed with an inclination angle A such that the diameter gradually increases as it goes in the assembling direction. The inclination angle A of the inclined guiding surface 62 may be approximately 1° to 5°. This inclination angle A allows the boot 19 and the sealing ring 23 to smoothly move without damaging the boot 19 contacting the inclined guiding surface 62.

The guider 61 may additionally include a final guide part 63 that follows the inclined guiding surface 62. As shown in FIG. 5, the final guide part 63 is formed to extend to the supporting surface 134 of the inner race 13 in the state set for assembling. Taking into consideration the position of the supporting surface 134 on the inner race 13, the final guide part 63 may include an insertion space 64 that allows for the insertion of a portion of the inner race 13. As shown in FIG. 5, by extending the outer surface of the final guide part 63 to the supporting surface 134 of the inner race 13, the boot 19 and the sealing ring 23 can be stably guided along the outer surface of the final guide part 63 to the supporting surface 134 of the inner race 13. In this embodiment, the final guide part 63 adjacent to the inclined guiding surface 62 is provided, but in other embodiments, the inclined guiding surface 62 can extend to the supporting surface 134 of the inner race 13 without a separate final guide part 63.

The pusher 81 is configured to provide a force that can move the boot 19 and the sealing ring 23 in the assembling direction. The pusher 81 is configured to push and move the assembled boot 19 and sealing ring 23 while moving in the assembling direction, as shown in FIG. 5. For example, the pusher 81 may be driven by an actuator such as a hydraulic cylinder, a pneumatic cylinder, an electric motor, etc., to move in the assembling direction. The pusher 81 may include a front end part 82 that provides a force to push the boot 19 and the sealing ring 23 while moving along the outer surface of the guider 62. In this regard, the front end part 82 may form an insertion space 83 that allows a portion of the guider 62 to be inserted so that the pusher 81 can move relative to the stationary guider 62. In FIG. 5, the right portion of the guider 61 is inserted into the insertion space 83 of the pusher 81, allowing the movement of the pusher 81 to occur. The pusher 81 may be configured to move under a load of 300 to 1500 N during assembling.

Meanwhile, in accordance with an embodiment of the present invention, the assembling device may further include a supporter 71 that is configured to support the boot 19 and the sealing ring 23 with respect to the pusher 81 during the assembling process. The supporter 71 is configured to move in the assembling direction along the outer surface of the guider 61, and for this purpose, the supporter 71 may form a through-hole 72 into which the guider 61 is inserted. As shown in FIG. 6, the supporter 71 may have a wedge-shaped protrusion 73 on an inner end of the leading edge in a radial direction. The protrusion 73 may have a wedge shape that becomes sharper as it goes toward the leading edge (on the left side in FIG. 5). As indicated by the dashed lines in FIG. 5. the supporter 71 is set in a state where the protrusion 73 is inserted between the second fixing part 194 of the boot 19 and the inclined guide surface 62, and the supporter 71 is configured to be pushed by the pusher 81 to move in the assembling direction from this state. The press-fitting of the boot 19 occurs in a state where the protrusion 93 of the supporter 71 is inserted into an inner circumferential surface, preventing the boot 19 from being pushed inward during the assembling process.

Although the embodiments of the present invention have been described above, the scope of rights of the present invention is not limited thereto, and it encompasses all changes and modifications that are easily made by those skilled in the technical field to which the present invention pertains and are deemed equivalent thereto.

INDUSTRIAL APPLICABILITY

The present invention pertains to a device that can be used for assembling a constant velocity joint of a vehicle, and therefore, it has industrial applicability.

The invention claimed is:

1. An assembling device for assembling a boot and a sealing ring to an inner race of a constant velocity joint in which a fixing part of the boot is fastened to the inner race by the sealing ring, the fixing part having a ring shape, comprising:

a guider provided with a guide surface on an outer surface to guide the boot and the sealing ring along a longitudinal direction of the inner race;

a pusher that provides a force to move the boot and the sealing ring along the guide surface to reach a support surface of the inner race; and a supporter interposed between the boot and the sealing ring assembled to each other and configured to move along a circumference of the guide in a movement direction of the boot and the sealing ring as the pusher moves, allowing the boot and the sealing ring to be pushed, wherein the supporter has a protrusion that is inserted between an inner surface of the fixing part and the guide surface.

2. The assembling device of claim 1, wherein the guide surface is an inclined guide surface formed to be inclined with respect to a movement direction of the boot and the sealing ring.

3. The assembling device of claim 2, wherein the inclined guide surface is formed to be inclined at an angle of 1° to 5°.

4. The assembling device of claim 1, wherein the protrusion has a wedge shape that becomes sharper towards a leading edge.

5. The assembling device of claim 1, wherein the pusher is configured to move under a load of 300 to 1500 N while pushing the boot and the sealing ring.

6. An assembling device for assembling a boot and a sealing ring to an inner race of a constant velocity joint in which a fixing part of the boot is fastened to the inner race by the sealing ring, the assembling device comprising:

a guider provided with a guide surface on an outer surface to guide the boot and the sealing ring along a longitudinal direction of the inner race; and a pusher that provides a force to move the boot and the sealing ring along the guide surface to reach a support surface of the inner race; and wherein the guider comprises a first insertion space for receiving at least a portion of the inner race, and the pusher comprises a second insertion space into which at least a portion of the guider is inserted, such that the pusher is configured to move relative to the guider to push the boot and the sealing ring while the guider is fitted into the pusher.

* * * * *